UNITED STATES PATENT OFFICE.

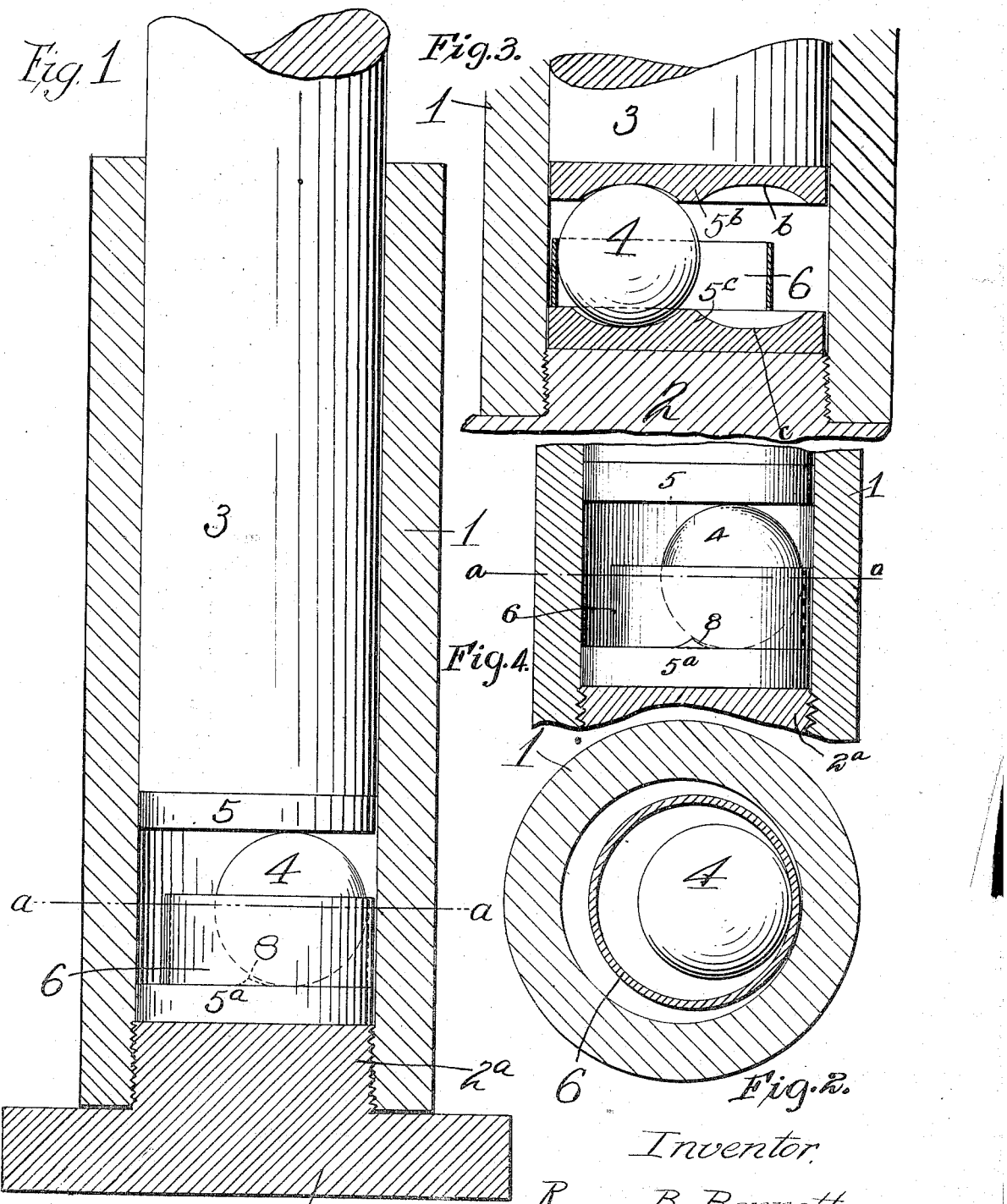

ROBERT B. BENNETT, OF NEW YORK, N. Y., ASSIGNOR TO ERASTUS S. BENNETT, OF NEW YORK, N. Y.

THRUST-BEARING.

1,192,373.

Specification of Letters Patent. Patented July 25, 1916.

Application filed July 9, 1912, Serial No. 708,487. Renewed December 15, 1915. Serial No. 67,081.

*To all whom it may concern:*

Be it known that I, ROBERT B. BENNETT, citizen of the United States, residing at New York, N. Y., have invented certain new and useful Improvements in Thrust-Bearings, of which the following is a specification.

My present invention relates to improvements in thrust bearings, and has among others for its objects to provide a ball or anti-friction bearing in which all liability of crushing or breakage with the incident disastrous results will be avoided; in which the number of contact points will be reduced to a minimum, and all comparatively sharp contact points will be removed; in which the ball motion will be slow and the wear distributed over the surface of the ball so as to avoid any danger of flattening of the same.

With these and other objects in view, the invention comprises the novel features of construction and arrangement and combination of parts hereinafter described and particularly defined by the appended claims.

A thrust bearing embodying my invention is illustrated in the accompanying drawings, in which—

Figure 1 is a vertical section through my improved bearing; Fig. 2 is a horizontal section on line $a$—$a$ of Fig. 1; and Fig. 3 is a sectional elevation of a modified form. Fig. 4 is a detail view of a modification.

Referring by reference characters to these drawings, the numeral 1 designates a boxing or sleeve, and 2 a bottom or end for the same, which is detachably connected thereto conveniently by having a threaded boss $2^a$ screwed into the lower end of the sleeve 1. The shaft to be supported is indicated at 3, and the anti-friction bearing is provided for by the insertion of a single large ball 4 interposed between the base 2 and the lower end of the shaft 3, the ball preferably bearing against upper and lower disks 5 and $5^a$ respectively.

The ball is preferably of greater diameter than one-half the diameter of the shaft, but of less than the whole diameter of the shaft, a ball within these limits being capable of sustaining without detrimental effect any weight which the shaft may transmit. Encircling the ball is a loose ring or cage 6 which is of a height slightly exceeding the radius of the ball, so that the periphery of the ball at the side will contact with the inner face of the cage.

The ball may be prevented from at any time assuming a position axially in line with the shaft by a conical projection 8 on the lower disk $5^a$, this projection insuring that the vertical axis of the ball shall be out of line with the axis of the shaft as illustrated in Fig. 4.

It will be understood that the space occupied by the ball will be filled with oil or other lubricant.

With a construction such as above described, it will be seen that the shaft will have a rolling support on a ball which, by reason of its comparatively large size, avoids any sharp contact, while by reason of the size of the ball and its contact approximately close to the axis of the shaft, the rotation of the ball on its own axis will be much less than the speed of rotation of the shaft, thereby avoiding the high speed or rotation of the balls as found in the ordinary ball bearings, which is detrimental to the life of the bearing. The cage interposed between the ball and boxing is free to slip with relation to the interior surface of the boxing and also with relation to the ball, thereby reducing friction at the sides. It will be also apparent that with a ball constructed and located as above described the wear will not be confined to a single annular path around the surface of the ball, but will be distributed to a considerable extent over the same.

Instead of having the ball travel between two plain disks, as shown in Fig. 1, I may form these disks with annular channels, as indicated in Fig. 3, in which the disks are indicated at $5^b$ and $5^c$, and the channels at $b$ and $c$, each channel being curved on the arc of a circle of greater diameter than the diameter of the ball.

Having thus described my invention what I claim is:

1. A thrust bearing comprising a support, a cylindrical ball inclosure, a shaft having its lower end within said inclosure, a single ball interposed between the support and shaft, and a cylindrical cage encircling the ball of a height exceeding the radius of the ball.

2. A thrust bearing comprising a support, a cylindrical ball container, a shaft having its lower end rotating in said container, a single ball between said support and shaft of a diameter less than the diameter of the shaft, but exceeding the radius of the shaft, and a cylindrical ring in excess of the diameter of the ball but less than the diameter of the ball containing chamber.

3. A thrust bearing comprising a cylindrical member, a shaft fitted to and journaled therein, a disk at the end of the shaft, a second disk spaced from said first disk, a suitable support, and a single ball interposed between said disks, said disks having plain surfaces for the ball to travel on and one of them having a central projection for maintaining the ball out of alinement with the shaft, the said ball having a one point bearing on each of the said disks at the point of traveling contact with the main portions of said disks respectively.

In testimony whereof, I affix my signature in presence of two witnesses.

ROBERT B. BENNETT. [L. S.]

Witnesses:
E. S. BENNETT,
MARGARET V. LEHR.